United States Patent [19]

Scheidegger

[11] 4,171,736

[45] * Oct. 23, 1979

[54] CLOSURE CAP AND APPARATUS FOR DISTRIBUTING SUCH CLOSURE CAPS AT HIGH SPEED

[76] Inventor: Albert Scheidegger, 30 rue Caporal Morange, 69100 Villeurbanne, France

[ * ] Notice: The portion of the term of this patent subsequent to Sep. 19, 1995, has been disclaimed.

[21] Appl. No.: 903,919

[22] Filed: May 8, 1978

Related U.S. Application Data

[62] Division of Ser. No. 862,915, Dec. 21, 1977, Pat. No. 4,114,774.

[30] Foreign Application Priority Data

Dec. 23, 1976 [FR] France ............................... 76 39882

[51] Int. Cl.$^2$ ............................................. B65G 11/00

[52] U.S. Cl. ........................................ 193/38; 193/41

[58] Field of Search ................ 193/38, 41, 25 FT, 46, 193/2 R; 198/388, 389, 390, 391

[56] References Cited

FOREIGN PATENT DOCUMENTS

| | | | |
|---|---|---|---|
| 2165255 | 8/1973 | France . | |
| 457847 | 6/1950 | Italy | 215/305 |
| 556424 | 2/1957 | Italy | 215/305 |

*Primary Examiner*—Jeffrey V. Nase

*Attorney, Agent, or Firm*—Dennison, Dennison, Meserole & Pollack

[57] ABSTRACT

A closure cap for bottles which is stamped from a blank and has a pair of tear assisting tabs thereon especially adapted for high speed bottling equipment and designed so as not to jam in the equipment. The tabs in the transport position form a V-configuration on their inner edges and their outer lateral edges are in parallel planes spaced apart a distance equal to the diameter of the cap; such construction permitting a following cap to enter between the tabs without riding up on the preceding cap.

1 Claim, 11 Drawing Figures

CLOSURE CAP AND APPARATUS FOR DISTRIBUTING SUCH CLOSURE CAPS AT HIGH SPEED

This is a division of application Ser. No. 862,915, filed Dec. 21, 1977, now U.S. Pat. No. 4,114,774, issued Sept. 19, 1978.

The invention relates to means for distributing closure caps and also to a new cap which may be used in such a process.

Before metal caps used for closing various bottles and similar containers are crimped about the neck of the container, such caps are in the shape of a disc member which is produced by deformation of a side portion cut out from a metal strip which may or may not be decorated. Each cap is either produced in a station which is integrated in the bottling chain, or is prefabricated outside the chain.

In the first case, the cap is received in a suitable orientation at the outlet from the shaping tool and is passed by way of a passage to the closure applying station. In the second case, the cap is tipped in a loose state into a distributor which orients the cap and engages it into a passage which supplies the crimping station. During these displacement phases but also when the caps are introduced into the crimping head, it frequently happens that caps become wedged, either by the caps riding up onto the preceding caps, or by virtue of defective orientation or arrangement of the tongue portion of the caps. This results in interruptions in feed to the crimping head and therefore in the operation of closing the containers and in the bottling chain.

Such interruptions are more frequent when each of the caps comprises two diametrally opposed tongue portions used in hand opening as when such caps are displaced, one of the portions is at the front of the cap. In this way, and no matter what care is applied to guiding the caps, it sometimes happens that the front tongue portions become bent, riding up on the rear tongue portions of the preceding caps, or arrive at the crimping head in the wrong position. These disadvantages therefore limit the use of caps with two tongue portions, although in other respects such caps are more attractive as they reduce the necessity of using a tool to open the container, subsequent to breaking the tongue portion.

In order to overcome these disadvantages, it is necessary to limit the speed of movement of the caps and the production rate of the closure station. Such limitations are very troublesome as they prevent this method of closure, namely a cap with tongue portions, from being used to close containers of small capacity, such as small beer bottles, as such containers are filled and closed at operating rates which are several times higher than those employed for filling and closing larger containers such as wine or still water bottles.

The aim of the present invention is to provide a process which makes it possible to distribute closure caps with two tongue portions at a speed higher than that of the present-day processes and apparatus.

This new process comprises providing two tongue portions forming a V-shape, at one side of the cap, displacing the cap parallel to the axis of symmetry of the V-shape of the two tongue portions so that the two tongue portions are to the rear, and guiding the cap by means of passages whose facing surfaces are separated by a distance which, apart from clearance, is equal to the largest distance between the opposite edges of the two tongue portions.

Thus, as soon as a cap is displaced in a passage, it is perfectly positioned by the contact of the outside edges of its tongue portions against the side surfaces of the passage. The result of this is that the cap cannot change its position in any way relative to its direction of movement, which makes it possible for the cap to be moved at a very high speed.

The process of the invention also comprises positioning the caps longitudinally in the guide passages, by abutment of the front part of their skirt portion at least against the facing edges of the V-shape formed by the two tongue portions of the preceding cap. In this way, the caps cannot ride one upon the other.

The invention also concerns the cap itself with two tongue portions used in carrying out this process.

This cap comprises two tearable tongue portions which form a V-shape and which are disposed symmetrically on respective sides of one of its central planes. The tongue portions are separated over the lower periphery of the cap by a spacing E, FIG. 1. The opposite lateral edges of the two tongue portions are separated by a distance H which is at least equal to the largest diameter of the cap skirt portion. The lateral edges are substantially disposed in parallel planes which are spaced by a distance equal to the largest diameter of the cap. The inside edges of the two tongue portions, with the lower periphery of the cap in spacing E, form a curvilinear recess. The curvilinear recess is substantially tangent to a circle having a diameter equal to the largest diameter of the cap. The recess between the two V-shaped tongue portions of the first cap and to abut against the first cap by its collar portion without riding up on the tongue portions of the first cap and thus giving rise to the danger of interfering with cap distribution.

By virtue of its construction, this cap has an aerodynamic shape which facilitates displacement thereof at high speed. Indeed, in this case, or when the cap is pushed by a jet of air, the two tongue portions form a stablizer and tend to maintain it, during its movement, in the position in which it was at the beginning of its movement. In addition, by virtue of its general shape, the cap can be very easily introduced into a crimping and distribution head which considerably reduces the danger of breakdown due to a stoppage in the feed of caps.

Understanding of the invention will be enhanced by means of the following description with reference to the accompanying diagrammatic drawing which shows by way of a non-limiting example an embodiment of the cap for carrying out the process of the invention. In the drawing.

Figure 7:
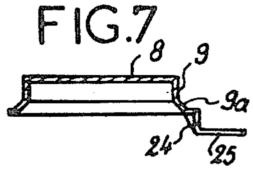
FIG. 7 is a view in longitudinal section showing another embodiment of the cap.
Figure 9:
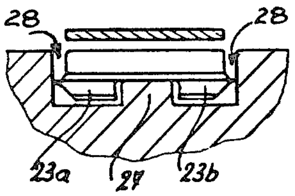
Figure 8:
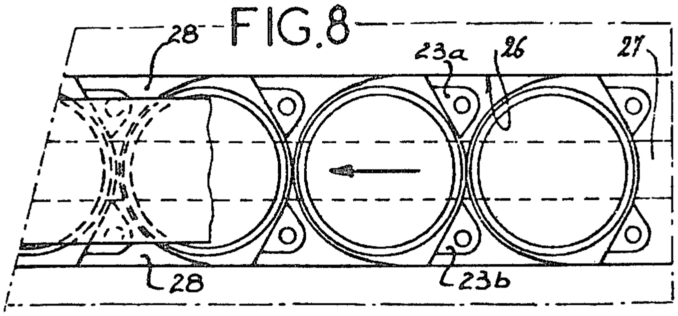
Figure 10:
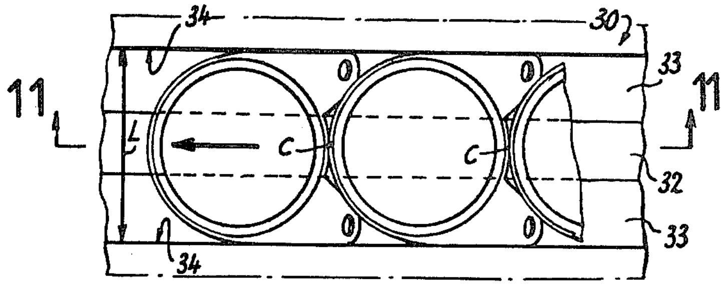
Figure 11:
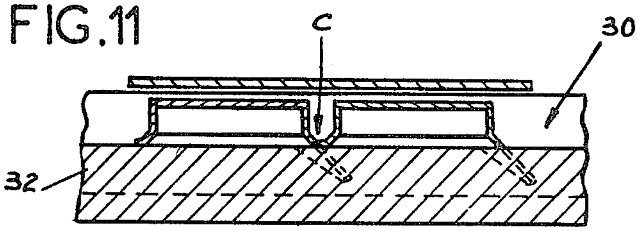

FIGS. 8 and 9 are a plan view and a transverse section respectively of the passage for carrying the FIG. 7 cap; and FIGS. 10 and 11 are a plan view from above and a view in longitudinal section along line 11—11 in FIG. 10, respectively, showing another embodiment of the cap and the passage used for distribution thereof.

Figure 1:
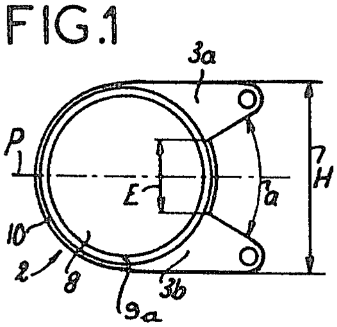
FIG. 1 is a plan view from above the cap.

As shown in FIG. 1, the cap 2 comprises two tear-off tongue portions 3*a* and 3*b* which form a V-shape and which are disposed symmetrically on respective sides of one of the caps central planes, as shown the plane P in FIG. 1.

Figure 4:
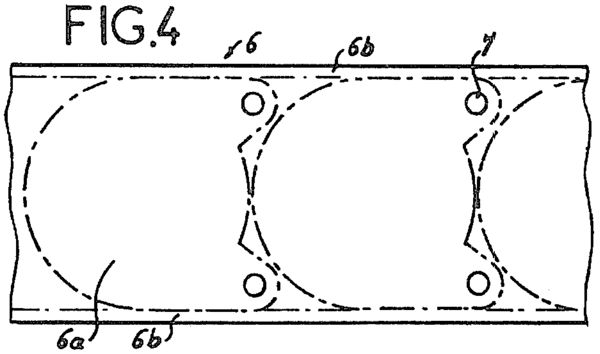
FIGS. 4 and 5 are plan views from above showing two embodiments of the metal strips which can be used to form the cap.
Figure 2:
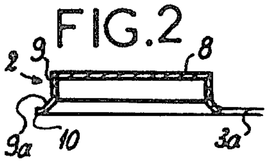
FIG. 2 is a longitudinal section through the cap of FIG. 1.
Figure 5:
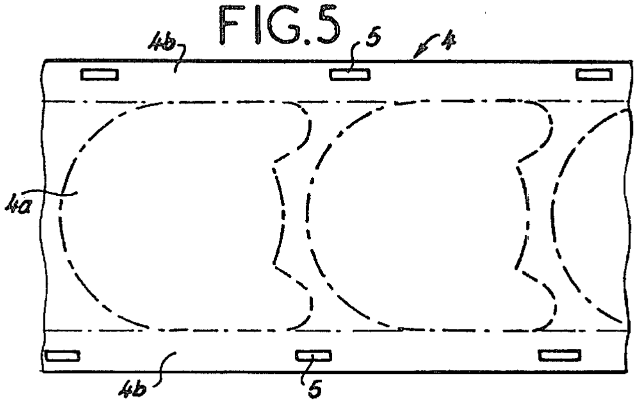

The cap is produced by cutting and shaping a conventional metal strip as shown at 4 in FIG. 5, that is to say, a strip comprising a central printed region 4*a* and two side regions 4*b* which are provided with perforations 5 for feeding the strip and positioning it at the cutting and shaping station. The cap can also be produced as shown in FIG. 4 by cutting and shaping a strip 6 comprising narrow side regions 6*b* and having perforations 7 which are disposed in the central region 6*a* and in the parts corresponding to the ends of the tongue portions 3*a* and 3*b*. After cutting and shaping any one of these strips, the cap is in the form shown in FIGS. 1 and 2, that is to say, it comprises a top portion 8, a depending skirt portion 9 which is flared at 9*a*, and a collar portion 10.

In the embodiment shown in FIGS. 1 to 6, the tongue portions of the cap are so arranged that their lower surface is in the plane containing the lower end of the collar portion 10 of the skirt portion 9.

Figure 3:
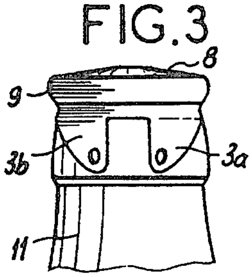
FIG. 3 is a side elevational view showing the cap in place on the neck of a container.

In addition, as shown in FIG. 1, the facing inner edges of the two tongue portions 3*a* and 3*b* are separated by a distance E and are at an angle a. After the cap has been crimped onto the container 11, as shown in FIG. 3, these two edges are substantially parallel.

Figure 6:
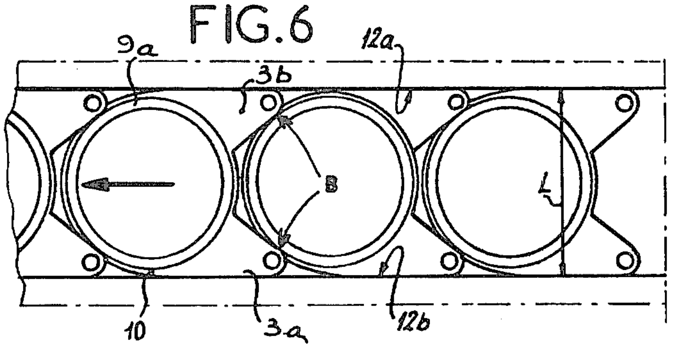
FIG. 6 is a plan view from above of a channel for conveying the caps.

As shown in FIG. 6, displacement of this cap is effected by means of guide passages whose facing surfaces 12*a* and 12*b* are separated by a distance L which is equal, apart from the functional clearance, to the distance H between the most remotely spaced parts of the opposite edges of the two tongue portions 3*a* and 3*b*. The caps are displaced in the passages, with their tongue portions 3*a* and 3*b* directed rearwardly thereof, in a direction which is parallel to the axis of symmetry of the two tongue portions of the cap. In this way, each cap is perfectly positioned during its movement, and there is no danger of its pivoting about its vertical axis.

In this embodiment, the angle a formed by the facing edges of the tongue portions is so determined that the said edges form a centering V-shape into which the forward part of the skirt portion of the following cap engages, as at B. In this way, the caps are perfectly positioned both longitudinally and transversely, and can be displaced at very high speed. Such positioning can also be supplemented by tangential contact between the collar portions 10 of two successive caps.

It should also be noted that, by virtue of the orientation which is imparted to each cap in its displacement, there is no problem in introducing the cap into a crimping head as the cap enters the head by way of the forward part of the cap which does not have any tongue portions. Moreover, the tongue portions 3*a* and 3*b* form stabilizers when the caps are displaced by jets of air or when they are displaced in the space between the end of a passage and the crimping head.

In another embodiment as shown in FIGS. 7, 8, and 9, after having been cut and shaped, the cap comprises tongue portions 23*a* and 23*b* which are bent so as to have a vertical portion 24 which is connected to the collar portion 10 of the skirt portion 9, and a horizontal portion 25 which is connected to the above-mentioned portion 24 and which is at a different level from the level of the above-mentioned collar portion 10. Apart from this detail difference, the cap is in all other respects similar to that described above. The tongue portions of this type are displaced in passages 26 similar to those mentioned above, but which in their bottoms comprise a central upstanding rib 27 whose width is less than the distance E between the two tongue portions 23*a* and 23*b*, therefore defining two longitudinal grooves 28 for the two tongue portions. The grooves and the rib therebetween are formed with a continuous surface. The purpose of this central rib is to support the skirt portion 9 of the cap, which is positioned transversely by means of the facing surfaces of the passage 26, such surfaces cooperating with the opposite edges of the two tongue portions of the cap. As such, the rib is of a height at least as great as the distance the tongue portions are displaced below the level of the collar portion. In this arrangement, the different caps which are moving along the passage 26 come into contact one with the other by the edge of their skirt portion and in a vertical plane which is different from the plane in which the tongue portions are displaced.

In the embodiment shown in FIGS. 10 and 11, the tongue portions are inclined downwardly, that is to say, they are at an angle to the plane of the base of the cap. This inclined position can be achieved either by bending relative to the collar portion, or, as shown in the drawings, by arranging the tongue portions in alignment with the conical part 9a of the skirt portion. Caps of this kind are displaced in passages 30 comprising a central longitudinal rib 32 whose width is less than the distance E between the facing edges of the two tongue portions, the rib thus defining two grooves 33. It will be understood, as in the above-described embodiments, that the distance L between the facing walls 34 of the passage is equal, except for the operational clearance, to the distance H between the most remote parts of the opposite edges of the two tongue portions. In this case, longitudinal positioning of the caps is effected by tangential contact at C, that is to say, by the front part of each cap contacting the rearward part of the preceding cap.

It will be seen from the foregoing that the arrangement of two symmetrical tongue portions at the rear of the cap makes it possible substantially to improve the conditions for positioning such a cap in its guide passages and in consequence makes it possible to attain much higher speeds of cap displacement, which in turn makes it possible to use this type of cap, with its two tongue portions, on bottling and processing chains which operate at very high production rates, and in particular on chains for filling small beer or soda bottles.

In addition, when the cap is crimped onto the neck of a container 11, and when it is desired to tear the cap off, the provision of the two tongue portions makes it possible to achieve this without having recourse to additional mechanical means. Moreover, the fact that the two tongue portions are symmetrical means that a left-handed person can open the container as easily as a right-handed person, which is not the case with conventional caps having one or two tongue portions. Indeed, with such conventional caps, the tongue portions are arranged such that they can be torn off with ease solely by a right-handed person, which makes the operation very critical for a left-handed person who is thus required to tear off the tongue portion by means of the strongest part thereof.

I claim:

1. Apparatus for distributing at a high speed tearable closure caps, each cap having a depending annular skirt and a pair of rearwardly facing tear tabs extending generally horizontally therefrom and terminating slightly below the level thereof, said tabs extending at an acute angle to each other, said apparatus including an elongated passageway having a bottom and side walls adapted to receive the closure caps therebetween, said side walls being spaced apart a distance substantially equal to the distance between the outer edges of the tear tabs so that the caps are guided in the passageway between the side walls by contact of the tab outer edges with the walls, a central rib in the passageway projecting upwardly from the bottom thereof, said rib being of lesser height than said side walls and of a height at least as great as the distance the tabs extend below the skirt for supporting said skirt, the width of said rib being less than the spacing of the tabs at their junction with said skirt, said rib and said side walls defining therebetween two longitudinal grooves, each receiving one of the tabs, the walls of each groove cooperating with the opposite edges of the corresponding tab, said side walls, bottom and rib being formed with a continuous surface.

* * * * *